US009508389B2

(12) United States Patent
Aralaguppe et al.

(10) Patent No.: US 9,508,389 B2
(45) Date of Patent: Nov. 29, 2016

(54) SYSTEM, METHOD, AND APPARATUS FOR EMBEDDING PERSONAL VIDEO RECORDING FUNCTIONS AT PICTURE LEVEL (71) Applicant: Broadcom Corporation, Irvine, CA (US)

(72) Inventors: Vijayanand Aralaguppe, Bangalore (IN); Gaurav Aggarwal, Allen, TX (US); Vijayaraghavan Ananthan, Bangalore (IN)

(73) Assignee: BROADCOM CORPORATION, Irvine, CA (US)

( * ) Notice: Subject to any disclaimer, the term of this patent is extended or adjusted under 35 U.S.C. 154(b) by 0 days.

(21) Appl. No.: 14/991,199

(22) Filed: Jan. 8, 2016

(65) Prior Publication Data

US 2016/0125917 A1 May 5, 2016

Related U.S. Application Data

(62) Division of application No. 11/088,456, filed on Mar. 24, 2005, now Pat. No. 9,236,092.

(51) Int. Cl.
*G11B 27/02* (2006.01)
*G11B 27/30* (2006.01)
*G11B 20/00* (2006.01)
*G11B 27/00* (2006.01)

(52) U.S. Cl.
CPC ....... *G11B 27/3027* (2013.01); *G11B 20/0021* (2013.01); *G11B 20/00086* (2013.01); *G11B 20/00492* (2013.01); *G11B 27/005* (2013.01); *G11B 27/007* (2013.01)

(58) Field of Classification Search
None
See application file for complete search history.

(56) References Cited

U.S. PATENT DOCUMENTS

| | | | |
|---|---|---|---|
| 6,078,725 A | 6/2000 | Tanaka | |
| 6,529,550 B2 | 3/2003 | Tahara et al. | |
| 6,580,869 B1 | 6/2003 | Ando et al. | |
| 6,904,526 B1 * | 6/2005 | Hongwei | G06F 21/31 713/172 |
| 2002/0136406 A1 | 9/2002 | Fitzhardinge et al. | |
| 2002/0141585 A1 * | 10/2002 | Carr | H04L 29/06027 380/255 |
| 2004/0090466 A1 * | 5/2004 | Loveria, III | G09G 5/14 715/781 |
| 2004/0264946 A1 | 12/2004 | Yamauchi et al. | |
| 2005/0086106 A1 * | 4/2005 | Takiyama | G06Q 30/02 705/14.4 |

(Continued)

FOREIGN PATENT DOCUMENTS

| | | |
|---|---|---|
| CN | 1193439 | 9/1998 |
| TW | 200421877 | 10/2004 |
| WO | WO-2005/002232 | 1/2005 |

OTHER PUBLICATIONS

Restriction Requirement for U.S. Appl. No. 11/088,456 mailed Jun. 18, 2007.

(Continued)

*Primary Examiner* — Eileen Adams
(74) *Attorney, Agent, or Firm* — Foley & Lardner LLP; Christopher J. McKenna; Helen H. Zhang (57) ABSTRACT

Described herein are system(s), method(s), and apparatus for embedding personal video recorder functions at the picture level. In one embodiment, there is presented a computer readable medium for storing a data structure. The data structure comprises a picture header and at least one command following the picture header.

20 Claims, 6 Drawing Sheets

(56) References Cited

U.S. PATENT DOCUMENTS

2005/0097614 A1* 5/2005 Pedlow, Jr. ........ H04N 7/17318 725/90
2005/0123274 A1 6/2005 Crinon et al.

OTHER PUBLICATIONS

Non-Final Office Action for U.S. Appl. No. 11/088,456 mailed Sep. 24, 2007.
Final Office Action for U.S. Appl. No. 11/088,456 mailed Mar. 18, 2008.
Non-Final Office Action for U.S. Appl. No. 11/088,456 mailed Jul. 25, 2008.
Final Office Action for U.S. Appl. No. 11/088,456 mailed Jan. 2, 2009.
Non-Final Office Action for U.S. Appl. No. 11/088,456 mailed Sep. 1, 2009.
Final Office Action for U.S. Appl. No. 11/088,456 mailed Apr. 15, 2010.
Non-Final Office Action for U.S. Appl. No. 11/088,456 mailed Sep. 19, 2011.
Final Office Action for U.S. Appl. No. 11/088,456 mailed Jan. 27, 2012.
Notice of Allowance for U.S. Appl. No. 11/088,456 mailed Aug. 25, 2015.

* cited by examiner

SYSTEM, METHOD, AND APPARATUS FOR EMBEDDING PERSONAL VIDEO RECORDING FUNCTIONS AT PICTURE LEVEL

RELATED APPLICATIONS

This application is a divisional of and claims priority to and the benefit of U.S. patent application Ser. No. 11/088,456, filed Mar. 24, 2005. The entire contents of the foregoing are hereby incorporated herein by reference for all purposes.

BACKGROUND OF THE INVENTION

Personal video recording functions allow a user to rewind, fast forward, pause, and play video data in slow motion. The foregoing functions can be implemented by displaying selected pictures from the pictures forming the video data.

Many video compression standards introduce data dependencies between pictures in a video. As a result, some pictures in the video are data dependent on other pictures in the video. Pictures that are data dependent on other pictures are decoded after the other pictures.

The compression standards typically restrict the permissible data dependencies between pictures in the video data, such that the decoding order has some relationship to the standard video display order. However, the decoding order can be vastly different from the rewind and fast forward order.

Due to copyright and security concerns, video data is increasingly encrypted. The video data is usually transmitted in transport packets. The transport packets include a header and payload. The payload includes encrypted video data.

The use of encrypted data complicates personal video recording functions. Certain personal video recording functions can display pictures in a different order from the standard playback order. In standard playback, the video data stream is accessed and consumed in generally a continuous manner. During a number of personal video recording functions, the video data is displayed in a non-continuous order. The encryption complicates accessing the video data at the appropriate intervals.

Further limitations and disadvantages of conventional and traditional systems will become apparent to one of skill in the art through comparison of such systems with the invention as set forth in the remainder of the present application with reference to the drawings.

SUMMARY OF THE INVENTION

Presented herein are system(s), method(s), and apparatus for embedding personal video recording functions at the picture level, substantially as shown in and/or described in connection with at least one of the figures, as set forth more completely in the claims.

These and other advantages and novel features of the present invention, as well as details of illustrated examples embodiments thereof, will be more fully understood from the following description and drawings.

DETAILED DESCRIPTION OF THE INVENTION

Figure 1:
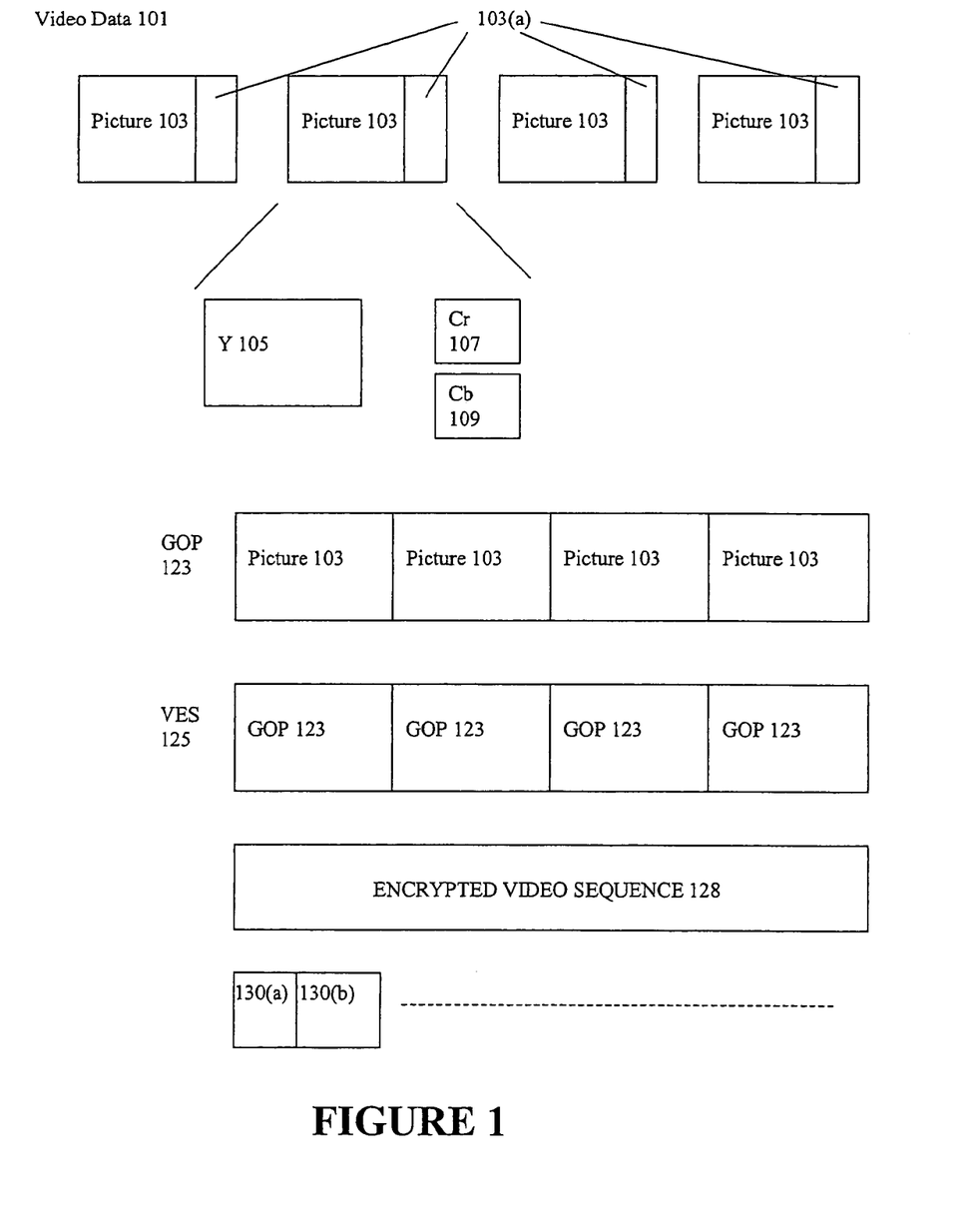
FIG. 1 is a block diagram describing encrypted and compressed video data.

FIG. 1 illustrates a block diagram of an exemplary Moving Picture Experts Group (MPEG) encoding process of video data 101, in accordance with an embodiment of the present invention. The video data 101 comprises a series of pictures 103. Each picture 103 comprises two-dimensional grids of luminance Y, 105, chrominance red $C_r$, 107, and chrominance blue $C_b$, 109, pixels.

The pictures 103 can be compressed using a variety of compression techniques that take advantage of both spatial and temporal redundancies. Additionally, the pictures 103 include a header 103(a) with parameter information. The pictures 103 are grouped together into a data structure known as a group of pictures (GOP) 123. The GOP 123 also includes additional parameters further describing the GOP. A number of GOPs 123 together form a video sequence 125.

Due to copyright and security concerns, video data is increasingly encrypted. Accordingly, the video sequence 125 can be encrypted using any one of a variety of schemes. The encrypted video sequence 128 is then packetized into what are known as transport packets 130. The transport packets 130 are fixed length packets and comprise headers 130a and payloads 130b. For example, the transport packets used by the MPEG standards are 188 bytes, including a four byte header and a 184 byte payload. The payload 130b carries the encrypted video sequence 128.

Figure 2:
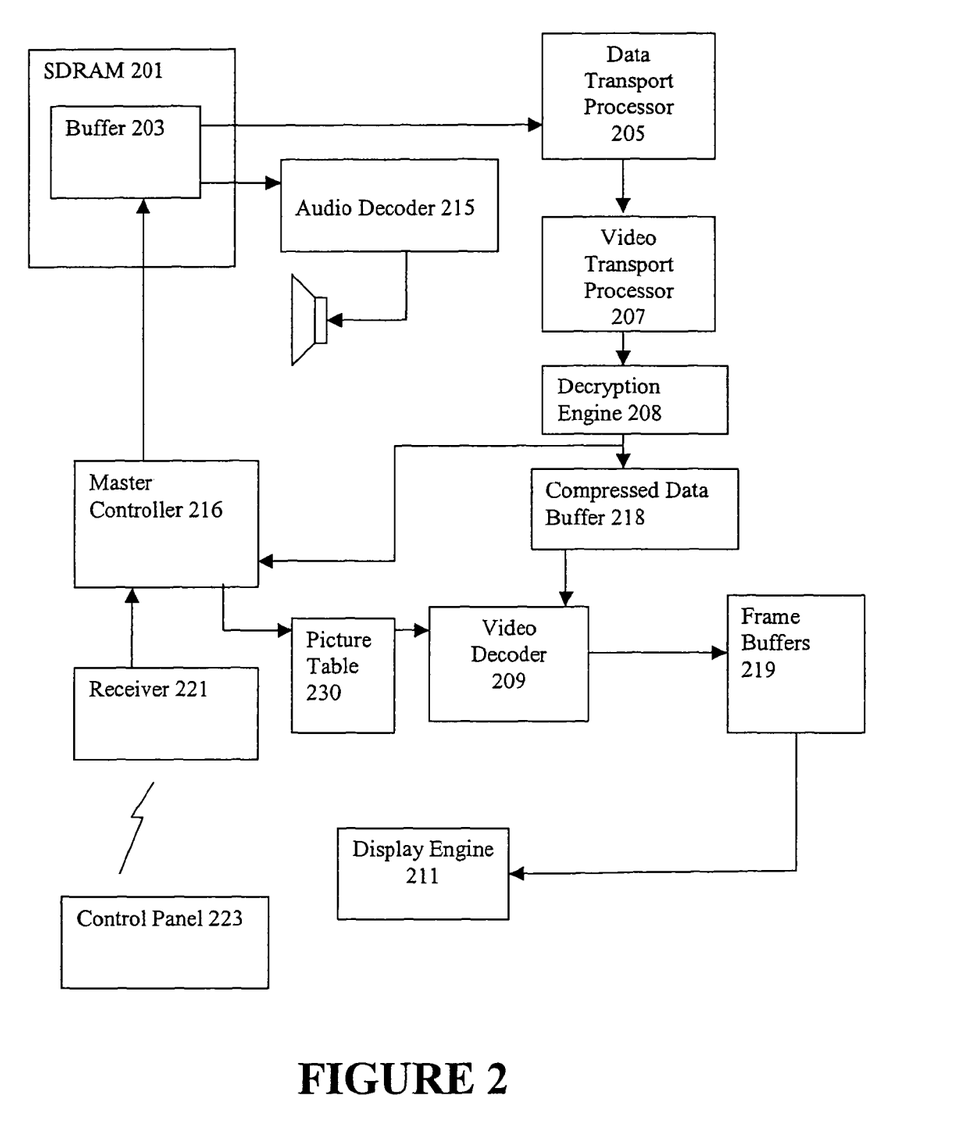
FIG. 2 is a block diagram describing an exemplary circuit for decoding video data in accordance with an embodiment of the present invention.

FIG. 2 illustrates a block diagram of an exemplary circuit for decrypting and decoding the encrypted video data, in accordance with an embodiment of the present invention. Data is received and stored in a buffer 203 within Synchronous Dynamic Random Access Memory (SDRAM) 201. The data can be received from either a communication channel, including, for example, a satellite or cable communication link, or memory, including, for example, a hard disc or DVD.

The data output from the buffer 203 is then passed to a data transport processor 205. The data transport processor 205 demultiplexes the transport stream into packetized elementary stream constituents, and passes the audio transport stream to an audio decoder 215 and the video transport stream to a video transport processor 207.

The video transport processor 207 extracts the payload 130b from the stream of transport packets 130, thereby recovering the encrypted video 128. A decryption engine 208 receives and decrypts the encrypted video 128 recovering the video sequence 125 and writes the video sequence 125 to a compressed data buffer 218.

A video decoder 209 decompresses pictures 103 of the video sequence 125 from the compressed data buffer 208 and writes the pictures 103 to frame buffers 219. The display engine 211 scales the picture 103, renders the graphics, and constructs the complete display.

The circuit also supports personal video recording functions, such as fast forward, and rewind, to name a few. The circuit includes a receiver 221 for receiving a signal from a control panel 223. The control panel can comprise a variety of input devices, such as a hand-held infrared or radio remote control unit, or a keyboard. The control panel 223 can either form a portion of the circuit or be separate from the circuit.

The user can initiate personal video recording functions from the control panel. The control panel 223 provides a signal corresponding to the particular personal video recording function to the controller 216 via receiver 221.

During standard playback, the pictures 103 are displayed in the order of capture by video camera during recording. Additionally, in MPEG-2, during standard playback, the pictures 103 are decoded in the order that the pictures 103 are received. Thus, the video data can be written to the buffer 203 in the order that the video data is received. The data transport processor 205, video transport processor 207, and decryption engine 208 can process the video data by fetching the video data from sequential addresses from buffer 203. Similarly, the video decoder 209 decodes the video data by fetching the video data from sequential locations in the compressed data buffer 218. This can be implemented by use of a pointer.

During fast forward and rewind operations, the video data is not necessarily decoded in the order that the video data is received. In contrast, during fast forward and rewind, the decoding order for the pictures may skip certain pictures. During the rewind operation, the decoding order for the pictures may reverse direction.

Accordingly, the controller 216 fetches encrypted GOPs 123 from the buffer 203. The decryption engine 208 decrypts the fetched encrypted GOP 123 and writes the GOP 123 to the compressed data buffer 218. The controller 216 creates a picture table 230 for the GOP 123. The picture table 230 indexes the pictures 103 of the GOP 123 in the compressed data buffer 218, indicating information such as the type of picture 103, and the address in compressed data buffer 218 from which the picture 103 starts.

The video decoder 209 uses the picture table 230 to locate particular pictures. Additionally, the controller 216 writes commands into the picture 103. In certain embodiments, the commands can be written into user data that immediately follows the picture header. The video decoder 209 is operable to detect and execute the commands. The execution of the commands effectuates the personal video recording functions. While the video decoder 209 decodes one GOP 123, the controller 216, and decryption engine 208 fetch, encrypt, create a table for, and writes commands for the next GOP 123 in the personal video recording function order. In the case of fast forward, the next GOP 123 is the next GOP 123 in the standard playback order. In the case of rewind, the next GOP 123 is the preceding GOP 123.

Figure 3:
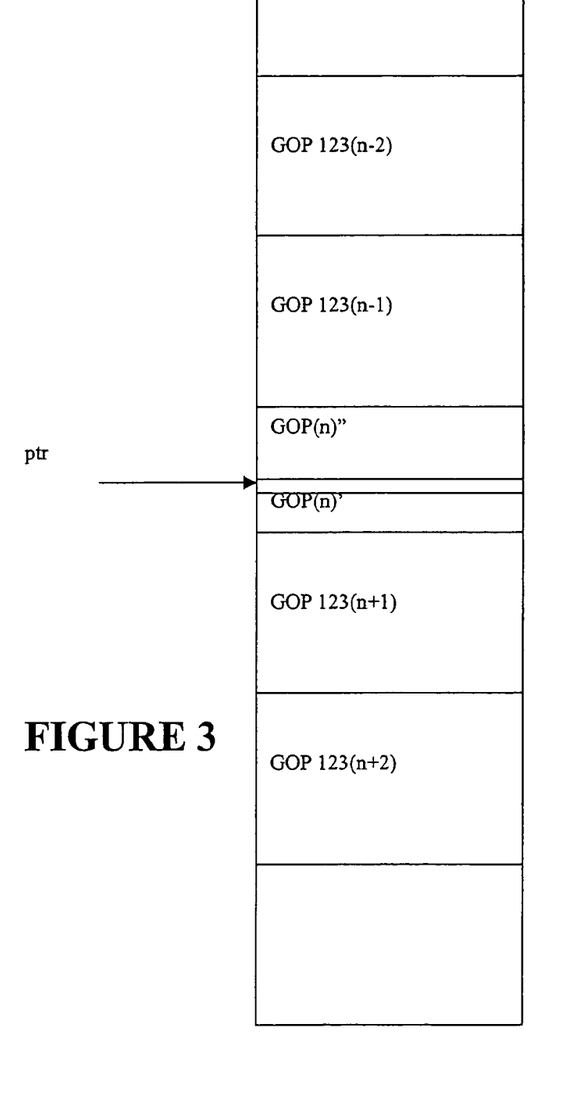
FIG. 3 is a block diagram describing a memory storing encrypted GOPs.

Referring now to FIG. 3, there is illustrated a block diagram describing encrypted GOPs 123($n-2$), 123($n-1$), 123($n$), 123($n+1$), 123($n+2$), . . . stored in the buffer 203. The encrypted GOPs 123 are generally stored in the buffer 203 in the order that the GOPs are received, and the encrypted GOPs are generally received in the order of standard playback.

Where during standard playback through picture 103 of GOP 123($n$), the circuit receives a request for the fast forward function, the controller 216 fetches the ending portion of GOP 123($n$)'. The decryption engine 208 decrypts the remaining portion of the GOP 123($n$)' and writes the decrypted remaining portion of the GOP 123($n$)' to the compressed data buffer 218. The controller 216 also receives and parses the remaining portion of the GOP 123($n$)', to create the picture table 230. The video decoder 209 decodes at least some of the pictures in the ending portion 123($n$)' of the GOP. According to certain aspects of the present invention, the controller 216 can also write commands that effectuate the fast forward function.

While the video decoder 209 decodes at least some of the pictures in the ending portion of the GOP 123($n$)', the controller 216 fetches the GOP 123($n+1$). The decryption engine 208 decrypts GOP 123($n+1$) and writes the decrypted GOP 123($n+1$) to the compressed data buffer 218. The controller 216 receives and parses the GOP 123($n+1$), to create the picture table 230 for GOP 123($n+1$). The foregoing can be repeated for any number of GOPs.

The controller 216 can fetch the ending portion of the GOP 123($n$)', and next GOPs 123($n+1$), 123($n+2$), . . . , by using a pointer ptr. The controller 216 fetches the remaining portion 123($n$)' by using the pointer ptr to fetch data words. After fetching each data word, the pointer ptr is incremented. In the foregoing manner, the controller 216 can fetch the data words for the remainder of GOP 123($n$)', followed by GOP 123($n+1$).

Where during standard playback through picture 103 of GOP 123($n$), the circuit receives a request for the rewind function, the controller 216 fetches the beginning portion of GOP 123($n$)'. The decryption engine 208 decrypts the beginning portion of the GOP 123($n$)'' and writes the decrypted beginning portion of the GOP 123($n$)'' to the compressed data buffer 218. The controller 216 also receives and parses the beginning portion of the GOP 123($n$)', to create the picture table 230.

The video decoder 209 decodes at least some of the pictures in the beginning portion 123($n$)'' of the GOP. According to certain aspects of the present invention, the controller 216 can also write commands that effectuate the rewind function.

While the video decoder 209 decodes the at least some of the pictures in the beginning portion of the GOP 123($n$)'', the controller 216 fetches the GOP 123($n-1$). The decryption engine 208 decrypts GOP 123($n-1$) and writes the decrypted GOP 123($n-1$) to the compressed data buffer 218. The controller 216 receives and parses the GOP 123($n-1$), to create the picture table 230 for GOP 123($n-1$). The foregoing can be repeated for any number of GOPs.

The controller 216 can fetch the beginning portion of the GOP 123($n$)'', and GOPs 123($n-1$), 123($n-2$), . . . , by using a pointer ptr. The controller 216 decrements the pointer ptr by a predetermined offset. The offset can be chosen to be large enough that the pointer ptr will point to an address that is at least before the starting address of the GOP. After decrementing the pointer ptr, the data words from the address pointed to by the pointer ptr are fetched and decrypted by the decryption engine 208. The controller 216 examines the decrypted video data. When the controller 216 detects the start of a GOP, the data words are written to the compressed data buffer 218.

Figure 4:
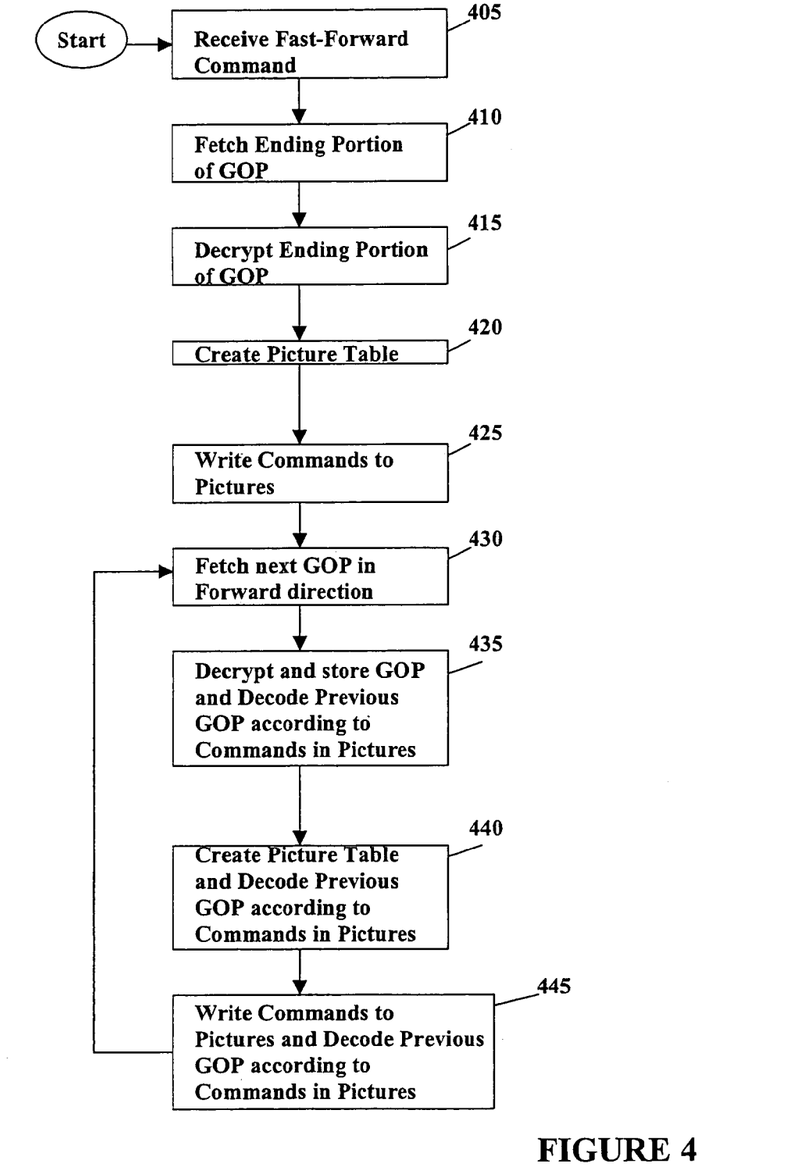
FIG. 4 is a flow diagram for the fast forward function in accordance with an embodiment of the present invention.

Referring now to FIG. 4, there is illustrated a flow diagram for the fast forward function, in accordance with an embodiment of the present invention. At 405, the controller 216 receives a fast forward command. At 410, the ending portion of the GOP(n)' is fetched. At 415, the ending portion of the GOP(n)' is decrypted. At 420, the controller 216 creates a picture table 230 for the remaining portion of the GOP(n)'. At 425, the controller 216 writes commands to the pictures 103 of the GOP(n)' that effectuate the fast forward command.

At 430, the next GOP in the forward direction, e.g., GOP 123($n+1$) is fetched. At 435, the GOP is decrypted and stored, while the previous GOP is decoded according to the commands written in the pictures. At 440, the controller 216 creates a picture table 230 for the GOP, while the previous GOP is decoded. At 445, the controller 216 writes commands to the pictures 103 of the GOP that effectuate the fast forward command, while the previous GOP is decoded. The foregoing, 430-445, can be repeated any number of times for any number of GOPs.

Figure 5:
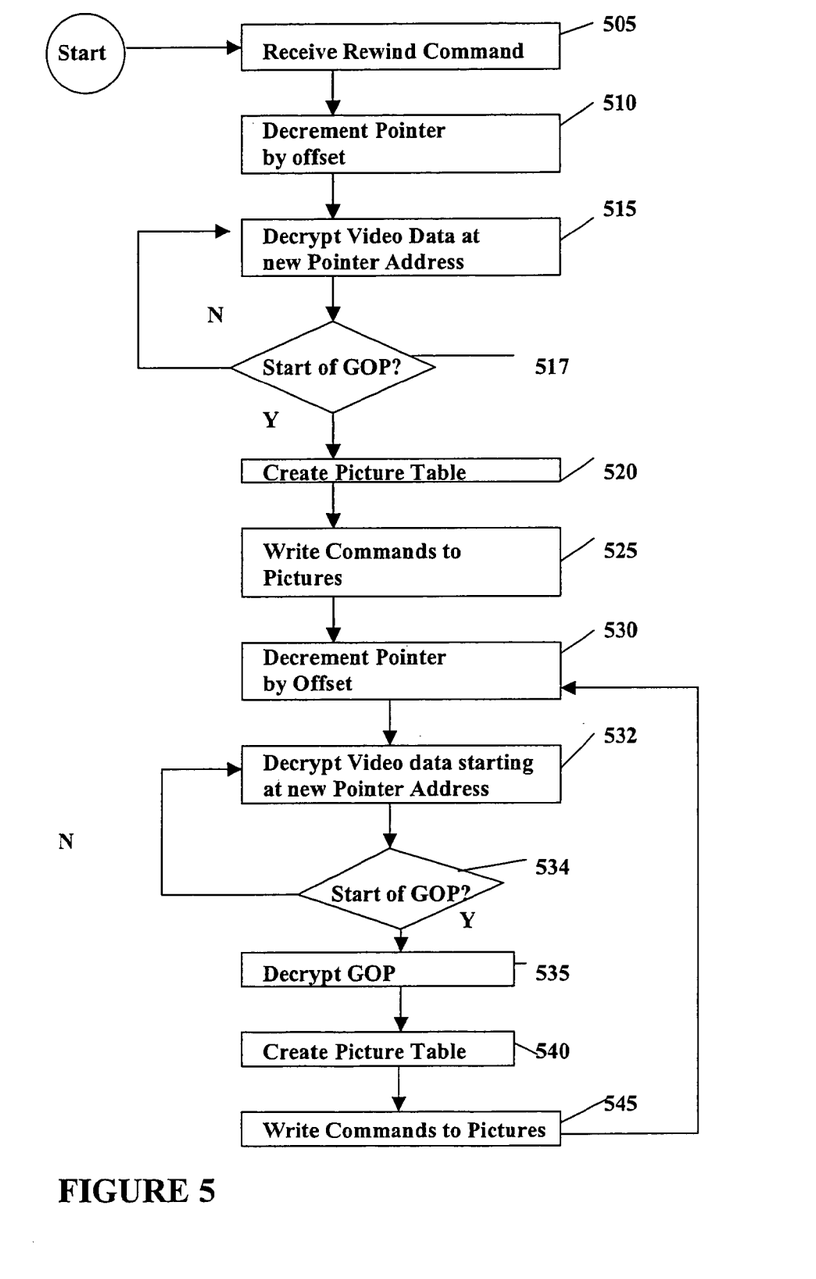
FIG. 5 is a flow diagram for the rewind function in accordance with an embodiment of the present invention.

Referring now to FIG. 5, there is illustrated a flow diagram for the rewind function in accordance with an embodiment of the present invention. At 505, the controller 216 receives a rewind command. At 510, the pointer ptr is decremented by an offset. At 515, the video data starting from the new pointer address until the end of the beginning portion is decrypted. At 517, the controller waits until the start of the GOP(n) is found. When the start of GOP(n) is found at 520, the controller 216 creates a picture table 230 for the beginning portion of GOP 123(*n*)'. At 525, the controller 216 writes commands to the pictures 103 of the that effectuate the rewind command.

At 530, the pointer ptr is decremented by the offset. At 532, the video data starting at the new pointer address is decrypted. At 534, the controller 216 waits until the start of the next previous GOP(n−1). At 535, the GOP is decrypted. At 540, the controller 216 creates a picture table 230 for the GOP. At 545, the controller 216 writes commands to the pictures 103 of the GOP that effectuate the fast forward command. The foregoing, 530-545, can be repeated any number of times for any number of GOPs. During 530-545, the video decoder 209 decodes at least some of the pictures in the next GOP, e.g., GOP 123(*n*).

Figure 6:
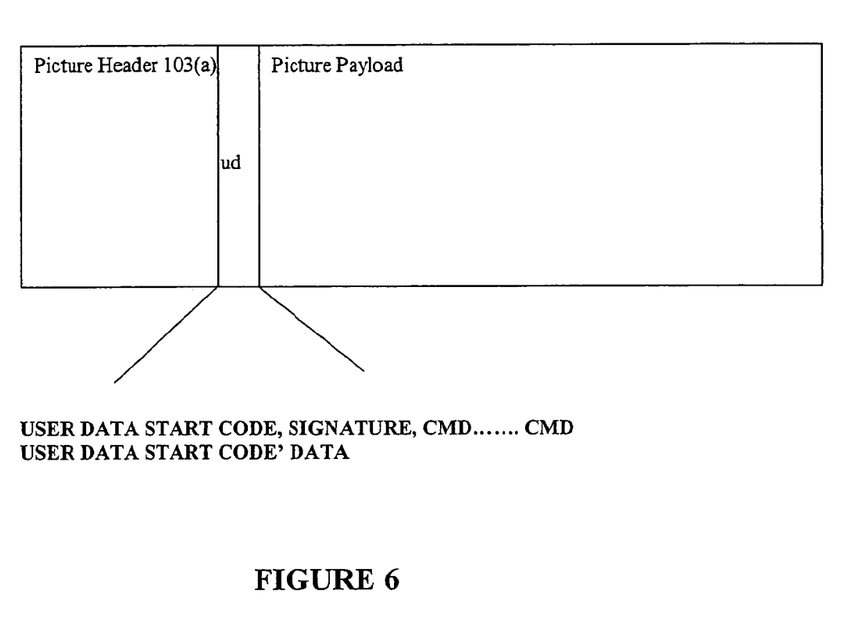
FIG. 6 is a block diagram of a picture storing commands for effectuating a personal video recording function in accordance with an embodiment of the present invention.

Referring now to FIG. 6, there is illustrated a block diagram of a picture 103 storing commands for execution by the video decoder 209. The picture 103 comprises a picture header 103(*a*). The picture header 103(*a*) is followed by a field known as user data, ud.

The controller 216 writes commands CMD effectuating the fast forward or rewind function by first writing a user data start code, USER DATA START CODE, asignature, SIGNATURE, followed by commands, CMD . . . CMD to the user data, ud. The signature, SIGNATURE, can comprise, for example, 0x42 52 43 4D.

In the case where the picture 103 includes user data prior to insertion of the commands CMD by the controller 216, the controller 216 writes the user data start code, USER DATA START CODE, signature SIGNATURE, and commands CMD, prior to the original user data start code USER DATA START CODE', and the user data DATA.

The particular sequence of commands can comprise, for example, the sequences of commands described in "Command Packet System and Method Supporting Improved Trick Mode Performance in Video Decoding Systems", application Ser. No. 10/317,389, filed Dec. 11, 2002, by Aggarwal, et. al., which is incorporated herein by reference for all purposes.

The foregoing does not depend on commands inserted in a transport packet. A host application can send commands to the video decoder even when the application is not using the transport layer, such as the packetized elementary stream layer or elementary stream layer. This is because the commands are carried through the user data. The user data is carried within the stream and does not need transport headers or packets. Thus, the foregoing can be used with systems that do not use transport streams for transmitting data.

The embodiments described herein may be implemented as a board level product, as a single chip, application specific integrated circuit (ASIC), or with varying levels of the decoder system integrated with other portions of the system as separate components. The degree of integration of the decoder system will primarily be determined by the speed and cost considerations. Because of the sophisticated nature of modern processor, it is possible to utilize a commercially available processor, which may be implemented external to an ASIC implementation. Alternatively, if the processor is available as an ASIC core or logic block, then the commercially available processor can be implemented as part of an ASIC device wherein certain functions can be implemented in firmware. In one embodiment, the present invention can comprise an integrated circuit.

While the invention has been described with reference to certain embodiments, it will be understood by those skilled in the art that various changes may be made and equivalents may be substituted without departing from the scope of the invention.

In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A method for displaying encrypted video data, comprising:
   decrypting, by a decryption engine, a first encrypted data structure comprising a first plurality of pictures to obtain the first data structure; and
   decrypting, by the decryption engine, a second encrypted data structure comprising a second plurality of pictures while decoding, by a video decoder, at least some pictures of the first plurality of pictures from the first data structure decrypted by the decryption engine,
   wherein decrypting the second encrypted data structure further comprises:
   fetching a portion of the encrypted video data, the portion of the encrypted video data starting from a first address that is offset from a second address by a predetermined offset, wherein the first encrypted data structure is stored starting from the second address;
   decrypting the portion of the encrypted video data and
   fetching another portion of the encrypted video data, the another portion of the encrypted video data starting from a third address that is offset from the first address by the predetermined offset.

2. The method of claim 1, further comprising:
   generating a first index, the first index associating one or more pictures from the first data structure with a corresponding one or more addresses,
   wherein each of the one or more pictures is stored at the corresponding one or more addresses associated with the one or more pictures.

3. The method of claim 1,
   wherein the video data has a standard playback order, and
   wherein the second plurality of pictures from the second data structure are displayed before the first plurality of pictures from the first data structure in the standard playback order.

4. The method of claim 1,
   wherein the portion of the encrypted video data does not comprise the second encrypted data structure.

5. The method of claim 1, further comprising:
   writing at least one command to at least one picture of the first plurality of pictures in the first data structure.

6. The method of claim 5,
wherein the at least one picture comprises a header, and
wherein writing the at least one command further comprises writing the at least one command into the header of the at least one picture.

7. The method of claim 5, wherein the at least one command effectuates a rewind function or a fast forward function.

8. The method of claim 1, wherein the first data structure comprises a first group of pictures and the second data structure comprises a second group of pictures.

9. A system for displaying encrypted video data, comprising:
a decryption engine that decrypts a first encrypted data structure comprising a first plurality of pictures to obtain the first data structure;
a video decoder that decodes at least some pictures of the first plurality of pictures from the first data structure decrypted by the decryption engine while the decryption engine decrypts a second encrypted data structure comprising a second plurality of pictures; and
a host processor that fetches a portion of the encrypted video data, the portion of the encrypted video data starting from a first address that is offset from a second address by a predetermined offset, wherein the first encrypted data structure is stored starting from the second address,
wherein the decryption engine decrypts the portion of the encrypted video data, and
wherein the host processor fetches another portion of the encrypted video data, the another portion starting from a third address that is offset from the first address by the predetermined offset.

10. The system of claim 9, further comprising:
a buffer that stores the first data structure
wherein the host processor generates a first index, the first index associating one or more pictures from the first data structure with a corresponding one or more addresses,
wherein each of the one or more pictures is stored at the corresponding one or more addresses associated with the one or more pictures.

11. The system of claim 9,
wherein the video data has a standard playback order, and
wherein the second plurality of pictures from the second data structure are displayed before the first plurality of pictures from the first data structure in the standard playback order.

12. The system of claim 9,
wherein the portion of the encrypted video data does not comprise the second encrypted data structure.

13. The system of claim 9, wherein the host processor writes at least one command to at least one picture of the first plurality of pictures in the first data structure.

14. The system of claim 13,
wherein the at least one picture comprises a header, and
wherein writing the at least one command further comprises writing the at least one command into the header of the at least one picture.

15. The system of claim 13, wherein the at least one command effectuates a rewind function or a fast forward function.

16. The system of claim 9, wherein the first data structure comprises a first group of pictures and the second data structure comprises a second group of pictures.

17. A non-transitory computer-readable medium storing machine instructions for displaying encrypted video data, the instructions when executed by at least one processor, causing the at least one processor to perform operations comprising:
decrypting a first encrypted data structure comprising a first plurality of pictures to obtain the first data structure;
decrypting a second encrypted data structure comprising a second plurality of pictures while decoding at least some pictures of the first plurality of pictures from the first data structure being decrypted;
fetching a portion of the encrypted video data, the portion of the encrypted video data starting from a first address that is offset from a second address by a predetermined offset, wherein the first encrypted data structure is stored starting from the second address;
decrypting the portion of the encrypted video data and
fetching another portion of the encrypted video data, the another portion of the encrypted video data starting from a third address that is offset from the first address by the predetermined offset.

18. The non-transitory computer-readable medium of claim 17, wherein the instructions when executed by the at least one processor cause the at least one processor to perform operations further comprising:
generating a first index, the first index associating one or more pictures from the first data structure with a corresponding one or more addresses,
wherein each of the one or more pictures is stored at the corresponding one or more addresses associated with the one or more pictures.

19. The non-transitory computer-readable medium of claim 17,
wherein the video data has a standard playback order, and
wherein the second plurality of pictures from the second data structure are displayed before the first plurality of pictures from the first data structure in the standard playback order.

20. The non-transitory computer-readable medium of claim 17,
wherein the portion of the encrypted video data does not comprise the second encrypted data structure.

* * * * *